United States Patent [19]
Lee et al.

[11] Patent Number: 5,561,649
[45] Date of Patent: Oct. 1, 1996

[54] DISK RECORDING MEDIUM AND REPRODUCTION METHOD AND APPARATUS THEREOF

[75] Inventors: Rae-hwan Lee; Hwa-jin Jeon, both of Suwon; Kwang-sik Choi, Seoul; Hong-soon Park; Sang-hwa Yun, both of Suwon; Kwang-lyeol Song, Seoul; Hae-min Choi, Kwacheon; Deok-hyun Lee, Seoul; Bong-hun Song, Suwon; Dong-jin Park, Incheon; Seong-jin Byeon, Seoul, all of Rep. of Korea

[73] Assignee: Samsung Electronics Co., Ltd., Kyungki-Do, Rep. of Korea

[21] Appl. No.: 211,558

[22] PCT Filed: Jul. 23, 1993

[86] PCT No.: PCT/KR93/00062

§ 371 Date: Apr. 4, 1994

§ 102(e) Date: Apr. 4, 1994

[87] PCT Pub. No.: WO94/14159

PCT Pub. Date: Jun. 23, 1994

[30] Foreign Application Priority Data

Dec. 17, 1992 [KR] Rep. of Korea ............... 92-24627
Jan. 14, 1993 [KR] Rep. of Korea ............... 93-417

[51] Int. Cl.$^6$ .................................................. G11B 5/09
[52] U.S. Cl. .......................... 369/47; 369/58; 369/32
[58] Field of Search .................. 369/47, 48, 49, 369/50, 54, 58, 60, 93, 98, 32, 33

[56] References Cited

U.S. PATENT DOCUMENTS 5,130,966  7/1992  Yoshio et al. .................... 369/49

Primary Examiner—Georgia Y. Epps
Assistant Examiner—P. W. Huber
Attorney, Agent, or Firm—Sughrue, Mion, Zinn, Macpeak & Seas

[57] ABSTRACT

A disk recording medium includes a lead-in area, a program area and a lead-out area. The program area includes: a first track on which a plurality of data signals each of which has a different index from the others is loaded; a second track on which a plurality of programs is loaded, whereby the plurality of programs consists of the sequential combination of the indices of at least one data signal among the plurality of data signals and each program has a different index from the others; a third track on which a data index table comprising the indices of the respective data signals and initial address information is loaded; and a fourth track on which a program index table comprising the indices of the respective programs and initial address information is loaded. The lead-in area is loaded with a table of contents comprising the initial address information and a plurality of pointers each of which is different from the others and designates the respective tracks of the program area and the initial position of the lead-out area. Thus, larger programs can be contained on a single disk and can be accessed without an operating program or an application program.

32 Claims, 13 Drawing Sheets

FIG. 1

| 1 2 | 3 4 | 5 6 7 8 | 9 10 11 12 13 14 15 16 | |
|---|---|---|---|---|
| CONTROL | | ADDRESS | TRACK NUMBER (TNR) | 1 |
| | POINTER | | MIN | 17 |
| | SEC | | FRAME | 33 |
| | ZERO | | P MIN | 49 |
| | P SEC | | P FRAME | 65 |
| CRC CODE | | | | 81 |

FIG. 2

| FRAME NUMBER | POINTER | P MIN | P SEC | P FRAME |
|---|---|---|---|---|
| n | 01 | \multicolumn{3}{l|}{DATA INDEX TABLE TRACK START ADDRESS} | | |
| n+1 | 01 | DATA INDEX TABLE TRACK START ADDRESS | | |
| n+2 | 01 | DATA INDEX TABLE TRACK START ADDRESS | | |
| n+3 | 02 | PROGRAM INDEX TABLE TRACK START ADDRESS | | |
| n+4 | 02 | PROGRAM INDEX TABLE TRACK START ADDRESS | | |
| n+5 | 02 | PROGRAM INDEX TABLE TRACK START ADDRESS | | |
| n+6 | 03 | DATA SIGNAL TRACK START ADDRESS | | |
| n+7 | 03 | DATA SIGNAL TRACK START ADDRESS | | |
| n+8 | 03 | DATA SIGNAL TRACK START ADDRESS | | |
| n+9 | 04 | PROGRAM TRACK START ADDRESS | | |
| n+10 | 04 | PROGRAM TRACK START ADDRESS | | |
| n+11 | 04 | PROGRAM TRACK START ADDRESS | | |
| n+12 | 05 | WARNING TRACK START ADDRESS | | |
| n+13 | 05 | WARNING TRACK START ADDRESS | | |
| n+14 | 05 | WARNING TRACK START ADDRESS | | |
| n+15 | A0 | PMA FIRST-TRACK START ADDRESS | | DATA SIGNAL CODING METHOD |
| n+16 | A0 | | | DATA SIGNAL CODING METHOD |
| n+17 | A0 | | | DATA SIGNAL CODING METHOD |
| n+18 | A1 | PMA LAST-TRACK START ADDRESS | | DATA SIGNAL CODING METHOD |
| n+19 | A1 | | | DATA SIGNAL CODING METHOD |
| n+20 | A1 | | | DATA SIGNAL CODING METHOD |
| n+21 | A2 | LOA STARTING ADDRESS | | |
| n+22 | A2 | LOA STARTING ADDRESS | | |
| n+23 | A2 | LOA STARTING ADDRESS | | |

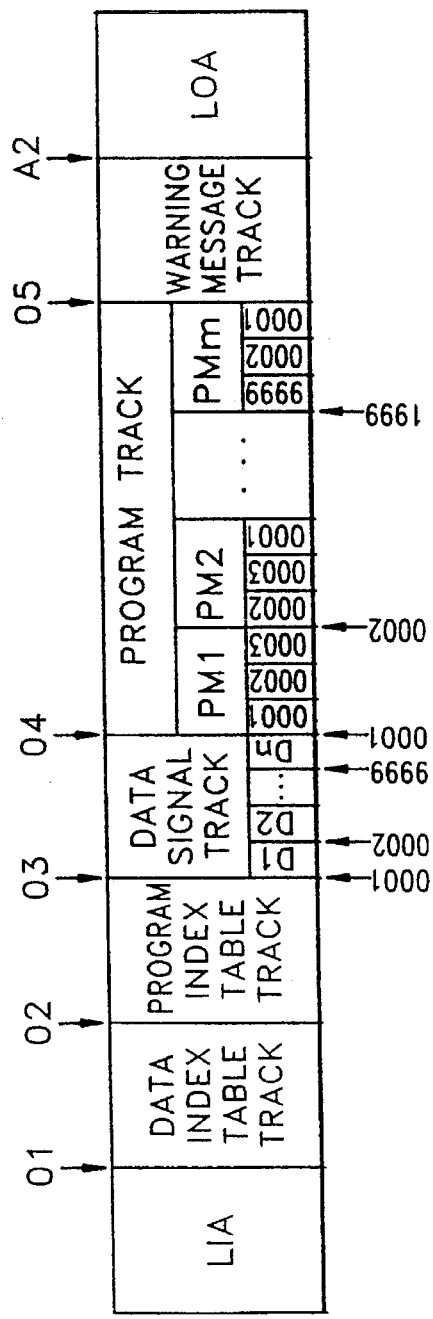

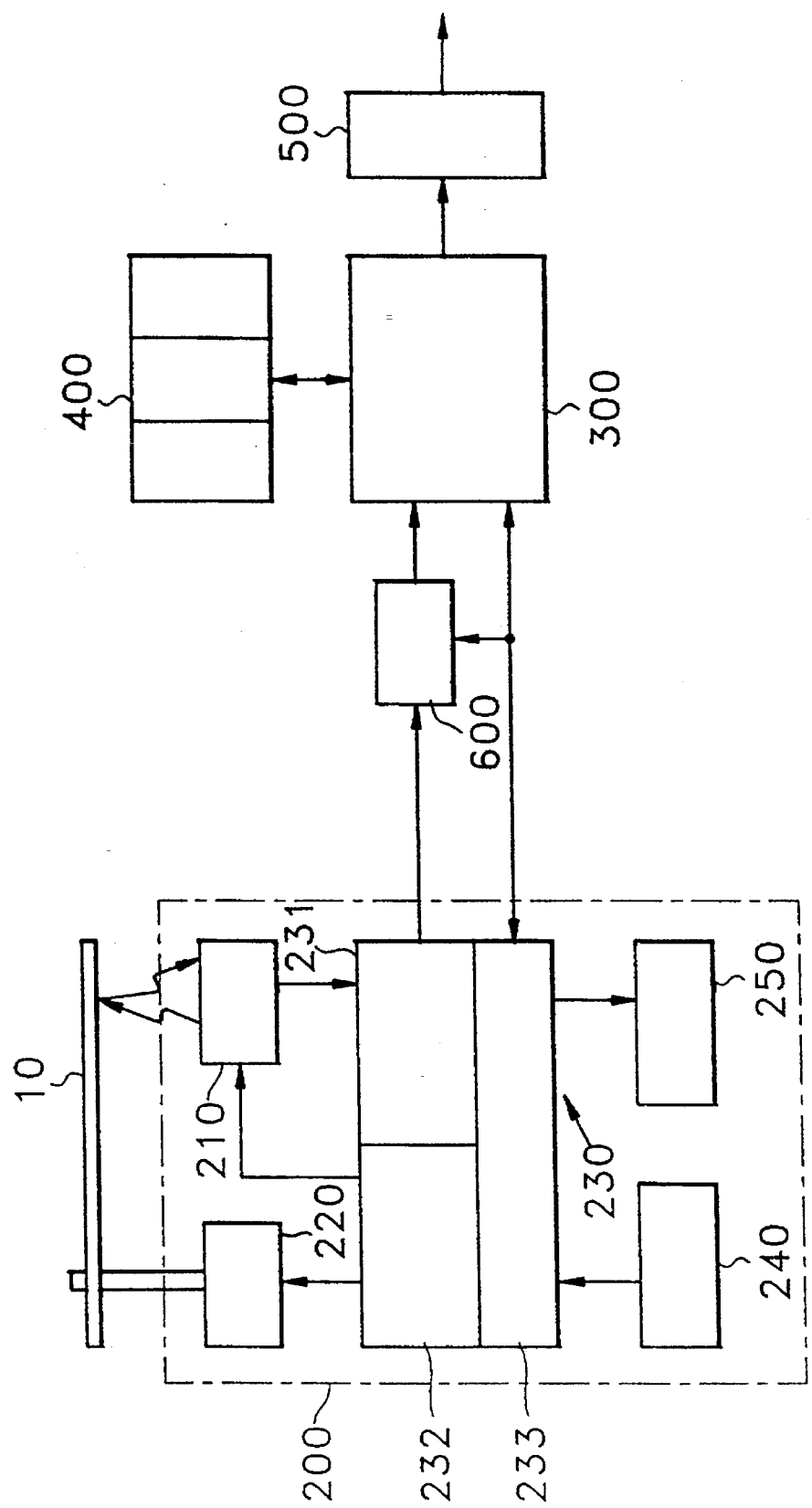

FIG. 8

| FRAME NUMBER | POINTER | P MIN | P SEC | P FRAME |
|---|---|---|---|---|
| n<br>n+1<br>n+2 | 01<br>01<br>01 | IMAGE TABLE TRACK START ADDRESS | | |
| n+3<br>n+4<br>n+5 | 02<br>02<br>02 | MUSIC TABLE TRACK START ADDRESS | | |
| n+6<br>n+7<br>n+8 | 03<br>03<br>03 | IMAGE DATA TRACK START ADDRESS | | |
| n+9<br>n+10<br>n+11 | 04<br>04<br>04 | MUSIC DATA TRACK START ADDRESS | | |
| n+12<br>n+13<br>n+14 | 05<br>05<br>05 | WARNING MESSAGE TRACK START ADDRESS POINT | | |
| n+15<br>n+16<br>n+17 | A0<br>A0<br>A0 | PMA FIRST-TRACK START ADDRESS | VIDEO DATA CODING METHOD | |
| n+18<br>n+19<br>n+20 | A1<br>A1<br>A1 | PMA LAST-TRACK START ADDRESS | VIDEO DATA CODING METHOD | |
| n+21<br>n+22<br>n+23 | A2<br>A2<br>A2 | LOA START ADDRESS | | |

FIG. 13
| CONDITION BYTE | | DATA1 | DATA2 |
|---|---|---|---|
| NOTE ON/OFF 4 BITS | MIDI CHANNEL 4 BITS | NOTE NUMBER TONE 8 BITS | VELOCITY SOUND STRENGTH 8 BITS |
FIG. 14
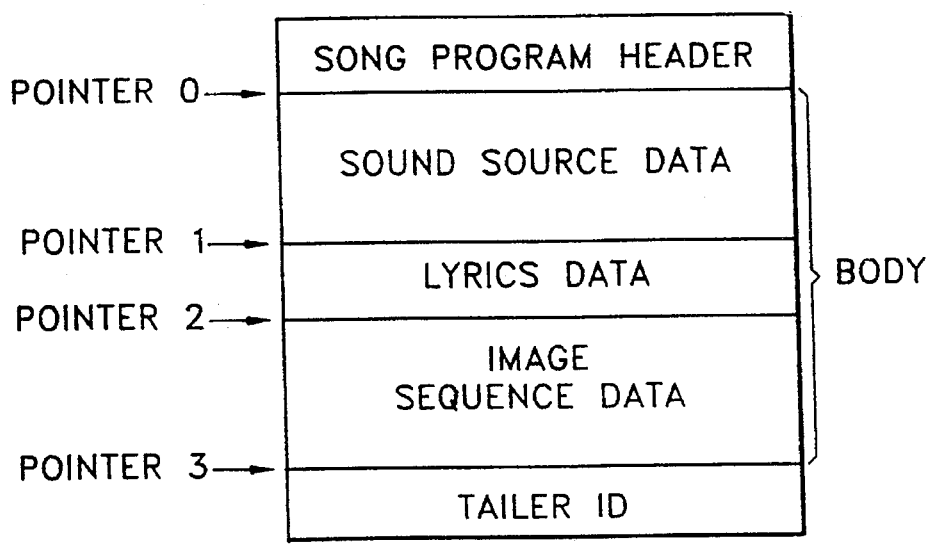
FIG. 15
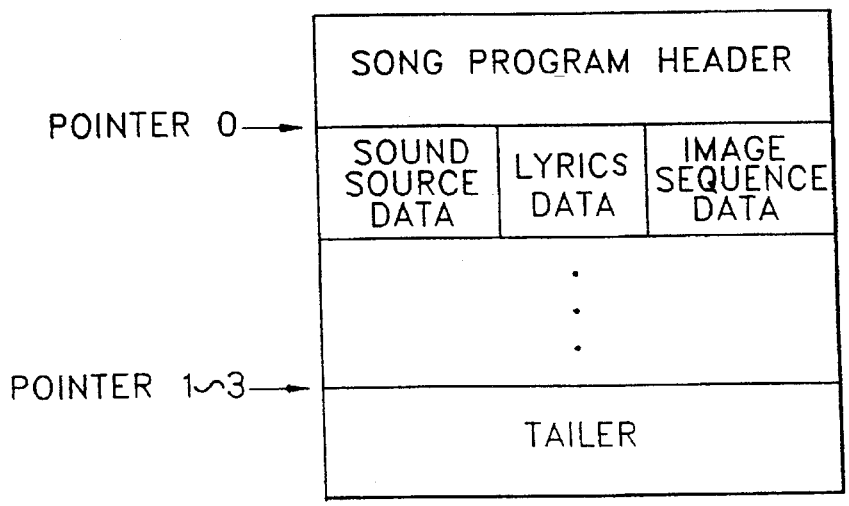

DISK RECORDING MEDIUM AND REPRODUCTION METHOD AND APPARATUS THEREOF

TECHNICAL FIELD

The present invention relates to a disk recording medium and a reproduction method and apparatus therefor, and, more particularly, to a compact disk (CD) system.

BACKGROUND ART

The CD is a recording medium in which an optically modulated large capacity digital data signal (at maximum 800 Mb) can be stored in a disk having a diameter of about 12 cm. Such CDs include: an audio exclusive-use CDDA which stores digital audio data; a compact disk graphics (CDG) or compact disk enhancement graphics (CDEG) medium for providing lyrics and graphic background pictures as well as audio by storing digital audio data, character data and graphic data therein; a CDV for storing digital audio data together with video data therein; a CD-ROM which can be used as a data base, electronic publication, etc., by storing various data and computer program data therein; and a compact disk interactive (CDI) system for use in multi-media systems by storing audio, video, character and computer program data therein. The physical recording formats of such CDs are based on the recording format of the CDDA. The data recording areas of the CD are largely classified into a lead-in area (LIA), a program area (PMA) and a lead-out area (LOA). In the CDDA, the digital audio data signal is recorded in the PMA, and then program running time and contents information (i.e., a "table of contents") is recorded in the LIA. Thus, the CD reproducer reads the recorded table of contents from the LIA prior to reproduction, and seeks a selected program to reproduce the corresponding program. The LIA consists of eight sub-code channels P, Q, R, S, T, U, V and W. The "table of contents" information utilizes the Q-channel and includes the program number and running time of a maximum of ninety-nine programs. The CDG utilizes R through W sub-code channels which are not used in the CDDA and includes a graphic function for visually displaying lyrics and images corresponding to the songs of a karaoke apparatus. Since such a CDDA or CDG searches the programs of the PMA with reference to the table of contents of the LIA, the number of programs which can be stored in the PMA is limited. For example, since one CD has a maximum capacity of 800 Mb, 8,000 still images each having a size of 100 Kb can be recorded thereon. However, table-of-contents information corresponding to 8,000 still images cannot be completely stored in the existing LIA region.

The CD-ROM and CDI reformulate an audio data block comprising 98 frames, which is a data processing unit, into that of a sector unit, in order to record or process the reformulated audio data block (refer to U.S. Pat. No. 4,893, 193). A CD-ROM driver is connected to a host computer (a personal computer) and performs a dependent reproduction operation by a CD-ROM operating program which is loaded onto a hard disk or floppy disk of the host computer. Thus, since the CD-ROM should use a particular host computer, compatibility between systems is essential. Accordingly, home distribution of CD-ROM systems is limited. To satisfy the compatibility requirements, a CDI system integrally includes in the CDI reproduction apparatus, the additional elements of a computer, a character reproduction circuit, an audio reproduction circuit and a computer data reproduction circuit. That is, the CDI system is a reproduction exclusive-use computer in which the hard disk or floppy disk of the computer is replaced by the CDI disk. Such a CDI system can access substantial amounts of data only by an application program contained on the disk, which, in terms of its operating system, is very similar to an ordinary personal computer. Accordingly, since the CDI system requires a particular operating system (OS), for example, a CD-RTOS (OS-9/68,000), and application program, the cost is increased due to specific software needs. The computer cannot directly access the data location recorded on the disk, and accordingly, the computer must access the data location via the OS or application program, which is troublesome.

On the other hand, a music video accompaniment apparatus (called a "karaoke" apparatus) displays song lyrics on a monitor while reproducing a musical accompaniment corresponding to the song, whereby users can sing along with the accompaniment by reading the displayed lyrics. Recently, such music video accompaniment apparatuses have been widely distributed, having been placed in music room establishments and in the home as well. Thus far, a laser disk (LD) karaoke apparatus using a laser disk, a computer karaoke apparatus using a semiconductor memory, and a CDG or CDEG karaoke apparatus using the graphics capability of a compact disk have been introduced.

Using a laser disk player, the LD karaoke apparatus reproduces a video signal, an audio signal and a character signal which have been recorded on the LD and displays the reproduced signals on the screen of a video display unit. Here, the audio signal is output through an audio unit. Accordingly, the merits of the LD karaoke apparatus include a high-quality picture and sound, and provisions for a background picture befitting the mood of the song, and lyrics which can be displayed as a motion picture.

However, as the LD (having a diameter of 30 cm) contains massive amounts of motion picture data together with the audio, the disk size is larger than that of the CD (whose diameter is 12 cm), and the number of programs which one laser disk can contain is limited to about 30 video-accompanied songs of average length. Thus, to furnish programs for 2,000 songs requires almost 70 laser disks, and since the price of one LD is still costly, purchasing such disks is burdensome. Also, since the disk is frequently changed according to music selection, a music room establishment should keep an attendant on duty or install an LD changing apparatus which is expensive. Also, due to the immensity of such an LD changing apparatus, considerable installation space is occupied. Moreover, the search speed is slow.

The CDG karaoke apparatus is an apparatus for simultaneously generating the video picture, lyrics and music by reproducing a CDG disk containing still images and character data in the graphic sub-coding channel of the CD. Such apparatuses have recently become popular for home use because CDs are smaller and cheaper than LDs. However, the picture quality of the CDG system is worse than that for LD usage with respect to the representation of a motion picture. Furthermore, since one disk for the conventional CDG system can contains only about 15 songs, a large number of such disks (approximately double) are required to match the capability of an LD system, which also increases the need for the above-mentioned disk-changing apparatus.

The computer karaoke apparatus utilizes a semiconductor memory device and stores song accompaniment data and lyrics data therein in the form of musical instrument digital interface (MIDI) data. Then, corresponding MIDI data is read out according to a song selection, and character data is displayed on a screen of the video display unit. Here, the song accompaniment data is output via an audio processor.

Such a computer karaoke apparatus records the song accompaniment data as MIDI data, differently from the recording method of the audio sampling data of the disk karaoke apparatus. Accordingly, various programs can be recorded, numbering approximately 1,000–1,500 songs. The computer karaoke apparatus can perform high-speed search operations according to the CPU's direct selection of a song, without changing the disk. However, displayed images corresponding to the song cannot be provided, as in the case of the disk karaoke apparatus. Also, sound quality is lower and, when increasing the number of songs for selection, memory capacity should be expanded, which further increases consumer expense. Also, the memory is incompatible with other media, such that programs cannot be easily moved between respective forms of data storage, differently from the medium having a shape of a disk.

As described above, the conventional music video accompaniment apparatuses all have drawbacks as well as merits, and their prices are still high. Accordingly, homes use of these apparatuses has not been greatly expanded.

DISCLOSURE OF THE INVENTION

Therefore, to solve the above problems, it is an object of the present invention to provide a disk recording medium having a new CD recording format capable of recording massive programs thereon.

It is another object of the present invention to provide a disk reproduction method and apparatus thereof in which program data is directly accessed and reproduced from a disk medium.

It is still another object of the present invention to provide a disk recording medium for exclusive-use with video song accompaniment, capable of containing song accompaniment data, lyrics and background pictures for thousands of songs on a single compact disk.

It is yet another object of the present invention to provide a reproduction method and apparatus thereof for a disk recording medium for exclusive-use with video song accompaniment, in which a search speed is fast without requiring a disk change.

It is a further object of the present invention to provide a video song accompaniment apparatus which is inexpensive, small and lightweight.

It is a still further object of the present invention to provide a video song accompaniment apparatus compatible with other storage media.

To accomplish the above objects of the present invention, there is provided a disk recording medium comprising a lead-in area, a program area and a lead-out area, wherein the program area comprises:

a first track on which a plurality of data signals each of which has a different index from the others is loaded;

a second track on which a plurality of programs is loaded, whereby the plurality of programs consists of the sequential combination of the indices of at least one data signal among the plurality of data signals and each program has a different index from the others;

a third track on which a data index table comprising the indices of the respective data signals and initial address information is loaded; and a fourth track on which a program index table comprising the indices of the respective programs and initial address information is loaded, wherein the lead-in area is loaded with a table of contents comprising the initial address information and a plurality of pointers each of which is different from the others and designates the respective tracks of the program area and the initial position of the lead-out area.

A reproduction method for a disk recording medium comprising a lead-in area, a program area and a lead-out area according to the present invention, comprising the steps of:

reading a table of contents from the lead-in area of the disk to obtain first and second address information during initial reproduction;

reading a data index table and a program index table from a first track and a second track of the program area according to the first and second initial address information, to store the read said data and said program index tables in a first memory area and a second memory area, respectively;

reading a data index sequence signal of a corresponding program from a third track of the program area according to the index, and respective initial address information of a selected program, to store the read data index sequence signal in a third memory area;

sequentially obtaining the initial address information of the data index from the data index table stored in the first memory area according to the data index sequence signal stored in the third memory area; and reading a corresponding data signal from a fourth track of the program area according to the initial address information of the respective data signals, to process, reproduce and output the read data signal.

In a disk reproduction apparatus for picking up and reproducing data signals from a disk recording medium, a reproduction apparatus for a disk recording medium according to the present invention comprises:

compact disk (CD) reproduction means for decoding a picked-up signal while servo-controlling the tracking of a disk with respect to a pickup according to address information, for outputting the decoded CD reproduction signal, and for generating a program selection signal according to a key input;

decoding means for receiving, de-scrambling and error-correcting the CD reproduction signal and for outputting the decoded data;

memory means for storing a data index table, a program index table and a data index sequence signal in respective first, second and third memory area of the memory means, respectively;

control processor means for receiving the data output from the decoding means, supplying the data and program index table signals and the data index sequence signal to the first, second and third memory areas, outputting a reproduction data signal, and supplying initial address information of the corresponding program and the data track to the CD reproduction means with reference to the data and the program index table signals and the data index sequence signal according to the program selection signal of the CD reproduction means; and signal converter means for receiving the reproduction data signal from the control processor means and converting the received reproduction data signal into a predetermined signal to thereby generate a reproduction output signal.

Also, to accomplish the above objects, there is provided a disk recording medium for exclusive-use with video song accompaniment comprising a lead-in area, a program area and a lead-out area, wherein the program area comprises:

- a first track for storing an image table on which index information for a plurality of video data constituting associated background pictures for respective song accompaniment programs is loaded;
- a second track for storing a music image table on which song index information of each song accompaniment program is loaded;
- a third track for storing video data on which the plurality of video data having video index information each of which is different from the others is loaded; and
- a fourth track for storing music data on which the song accompaniment programs each having MIDI data, lyrics data and sequence data of the video data corresponding to respective songs for accompaniment, and having respective song index information, is loaded,
- wherein the lead-in area is loaded with a table of contents comprising initial address information and a plurality of pointers each of which is different from the others and designates respective tracks of the program area and the initial position of the lead-out area.

A reproduction method for a disk recording medium for exclusive-use with video song accompaniment comprising a lead-in area, a program area and a lead-out area according to the present invention, comprises the steps of:

- during initial reproduction, reading a table of contents from the lead-in area of the disk recording medium to obtain first and second address information;
- reading an image table and a music table from a first track and a second track of the program area according to the first and second initial address information, to store the read the image and the music tables in a first memory area and a second memory area, respectively;
- obtaining address information of the selected song accompaniment program with reference to the music table of the second memory area according to selection of a song accompaniment program, and reading corresponding song accompaniment program data from a fourth track of the disk recording medium according to the obtained address information to store the read data in a third memory area; and
- sequentially reading corresponding video data from a third track of the disk recording medium with reference to a video data sequence table among the song accompaniment program data stored in the third memory area, restoring the MIDI data read from the third memory area into an audio signal to output the restored audio signal, and simultaneously mixing the read video data with the lyrics data read from the third memory area to display the mixed data as a video signal on a display.

A reproduction apparatus for use in a video song accompaniment apparatus for displaying song lyrics and background pictures on a screen, together with song accompaniment, comprises:

- input means for generating a key signal for selecting a song;
- CD reproduction means for reproducing a CD signal from a disk recording medium for exclusive-use of a music video accompaniment according to a key input of the input means;
- decoding means receiving the CD signal for generating a decoded signal;
- memory means for storing a song accompaniment program table, a video data table for background pictures and song accompaniment program data among the decoded signals therein, respectively;
- video processing means for receiving song lyrics and background picture data and developing a video signal;
- audio processing means for receiving the MIDI data for use with song accompaniment and generating a mixed analog audio signal; and
- a control processor for receiving the decoded signal for and storing the received decoded signal in the memory means, for supplying an address signal of a corresponding song program to the CD reproduction means according to a song selection with reference to the song program table, for supplying respective data address signals to the CD reproduction means with reference to the video data table according to the video data sequence table of corresponding song program data, for supplying video data reproduced and decoded from the disk recording medium in response to the video data address signal to the video processing means, and for forming the song program data according a MIDI data format so as to permit the MIDI data to be supplied to the audio processing means.

BRIEF DESCRIPTION OF THE DRAWINGS

FIG. 1 shows a data structure of a Q sub-code channel in a compact disk.

FIG. 2 shows a table of contents of a Q sub-code channel according to one embodiment of the present invention.

FIG. 3 conceptually illustrates a track structure of a program area in a compact disk according to the present invention.

FIG. 4 shows an example of a data index table of FIG. 3.

FIG. 5 shows an example of a program index table of FIG. 3.

FIG. 7 is a high level block diagram of a disk reproduction apparatus according to the present invention.

FIG. 8 shows an example of a table of contents for a Q sub-code channel according to another embodiment the present invention.

FIG. 13 illustrates a note-on/off message structure for musical instrument digital interface (MIDI) data.

FIG. 14 shows an example of a data structure of a song program according to the present invention.

FIG. 15 shows another example of a data structure of a song program according to the present invention.

DESCRIPTION OF THE PREFERRED EMBODIMENT

Figure 6:
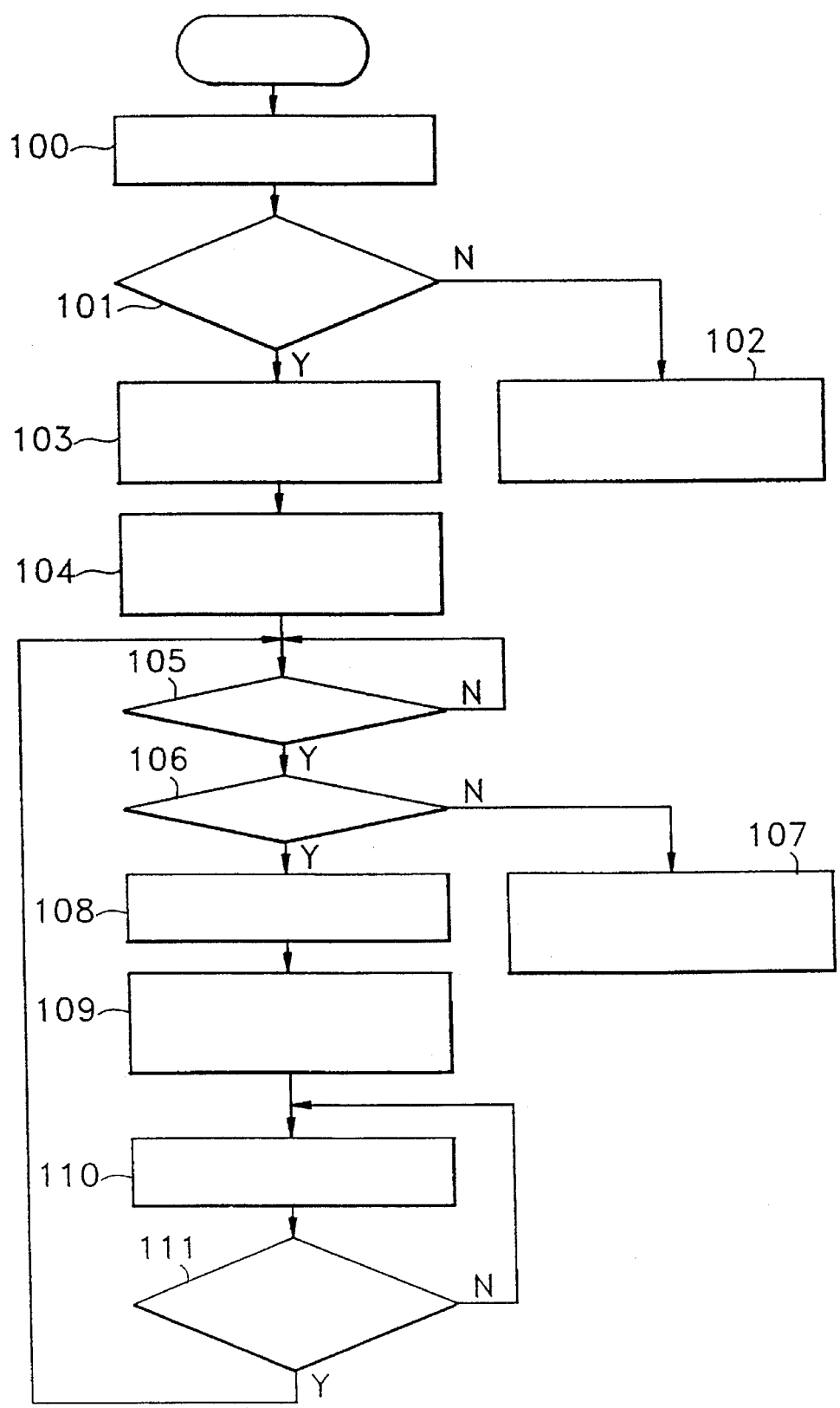
FIG. 6 is a flowchart diagram of a disk reproduction method according to one embodiment of the present invention.

Hereinafter, the present invention will be described in more detail with reference to the attached drawings.

The disk recording medium of the present invention comprises mainly a lead-in area (LIA), a program area (PMA) and a lead-out area (LOA), as do conventional CDDA disks. FIG. 1 shows the Q-channel data structure for the LIA. Among the eight channels of P, Q, R, S, T, U, V and W data, each of which has 98 frames, the Q-channel data structure having 98 second-channel bits is composed of 96 bits plus two synchronization bits. Here, four control bits and four address bits are followed by 72 data bits which are composed of an eight-bit track number code (TNR), an eight-bit pointer, a 24-bit address (minute, second and frame), eight-bit interval bits (zero) and a 24-bit pointer address (PMIN, PSEC and PFRAME). The data bits are followed by a sixteen-bit cyclic redundancy check (CRC) code. In the LIA, the TNR of the Q-channel is the decimal number "00." The LIA contains the content information for a recorded disk, i.e., a table of contents (TOC). The TOC is comprised of the Q-channel, pointer and a pointer address indicating minutes, seconds, and the frame value of the starting point for each program of the PMA which has a predetermined number of tracks.

FIG. 2 shows an embodiment of the TOC according to the present invention. When the value of the pointer is "01," the minute data (PMIN) indicates the starting address of the data index table track. When the pointer value is "02," the PMIN data indicates the starting address of the program index table track. When the pointer value is "03," the PMIN data indicates the starting address of the data signal track. When the pointer value is "04," the PMIN data indicates the starting address of the program track. When the pointer value is "05," the PMIN data indicates the starting address of the warning track. When the pointer value is "A0," the PMIN data indicates the starting address of the first track of the program area, and when the pointer value is "A1," the PMIN data indicates the starting address of the last track of the program. When the pointer values are "A0" or "A1," the data of PSEC and PFRAME indicate the method of data signal coding for the data signal track, and when the pointer value becomes "A2," the PMIN data indicates the starting address of the LOA. Accordingly, the TOC structure of the present invention is composed differently from that of the conventional CD-type TOC structure.

Referring to FIG. 3, the program area (PMA) of an embodiment according to the present invention comprises largely a data index table track, a program index table track, a data signal track, a program track and a warning message track. The starting position of each track is indicated by the TOC pointers, as described earlier. On the data signal track, predetermined data signals D1 through Dn are recorded having basic units constituting a program. For example, if the data signal is an n-page still image data signal, the signal is classified into the page units, and the still image data signal for each page has a predetermined index and starting-address information. One page of still image data comes to 384×240 bytes for a delta YUV (DYUV) coding method, so that if the data is composed of a MODE2 FORM2 sector, the amount of data corresponds to about 40 sectors. In the case of an RGB555 coding method, the number of bytes is 384×240×2 (184,320 bytes), so that the data being of the MODE2 FORM2 sector corresponds to about 79 sectors. Accordingly, the unit size of each data track varies according to the kind of data, coding method, and constituting modes. Here, the data signal is composed of not only the still image data but also sound source data, font data, etc.; combinations thereof are also possible. The TOC signal of a data signal is recorded on the data index table track which collects the indices and the starting-address information of the aforementioned data signal. FIG. 4 shows an embodiment of a data index table wherein, when the data index is "0001," the minute, second and frame data indicate the absolute elapsed time from the starting point of the PMA to the starting point of data signal D1, in terms of an initial address. A plurality of programs are recorded on the program track and are composed of index sequence combinations of at least one or more data signals. Programs PM1 through PMm are constituted by the index data of each data signal constituting the programs. For example, if one program is composed of a three-page still image data signal, the program can be indicated by sequentially recording the index information of the still images in a sequence in which these still images constitute the program. The TOC signal of the programs are recorded on the program index table track which collects therein the index and the initial address information of the aforementioned programs. FIG. 5 shows an embodiment of the program index table. When the program index is "0001," the minute, second and frame data indicate the absolute elapsed time from the PMA starting point to the starting point of program PM1, in terms of an initial address. On the warning message track, in order to transfer a warning message when the disk recording medium according to the present invention is reproduced by the conventional CDDA reproducing apparatus, a message may be recorded; for example: "This disk is a Samsung CDK disk which needs a Samsung CDK player for reproduction." The data recorded on the disk of the present invention can be recorded conforming to MODE0, MODE1 and MODE2 formats for CD-ROMs, and to MODE1 & MODE2 FORM1 and MODE2 FORM2 formats for CDIs.

As described above, the disk recording medium of the present invention does not record the whole data signal constituting the program, but records on the separate track the basic data signal components constituting all programs and constructs each program with the indices conforming to the sequence combination of these data signal components, so that the overlapped data can be removed and thus more data can be contained in one disk. Therefore, the program and data tables can be recorded on the PMA, allowing many more program TOCs to be recorded.

Relating to FIG. 6, a method for reproducing the data from the disk recording medium according to the present invention will be explained.

Firstly, at the beginning of reproduction, the TOC is read out from the LIA (step 100), and then the disk is checked to ascertain whether it is a CDK disk of the present invention (step 101), with the corresponding disk-reproduction processing being performed if it is not. For CDK disks (step 101), the initial address value of the data index table track and the initial address value of the program index table are obtained from the TOC, and the data index table is read out from the PMA (step 103). Thereafter, the program index table is read out (step 104). If a user selects a desired program (steps 105 and 106), the index of the selected program is searched by referring to the program index table, so as to obtain the initial address value of the corresponding program index. According to the obtained initial address value of the program, the corresponding program is read out from the PMA (step 108). Next, according to the data index sequence loaded in the read-out corresponding program, the initial address value of the data signal is searched from the data index table, and according to the initial address value of the obtained data signal the corresponding data signal is sequentially read out from the data signal track of the PMA (step 109). The read-out data signal is converted and processed into a predetermined output signal, so as to be reproduced and output (step 110). Step 110 is repeated until the last data signal of the corresponding program is reproduced and output. When the reproduced output of the last data signal is finished, the flow goes back to step 105, and waits until the next program is selected (step 111).

According to the reproducing method of the present invention as above-described, it can be known where the data signal of the program will be located on the disk, so that the next data signal is read out in advance and is standing by while the current data signal is being output. Thus, the reproduction signal can be output and reproduced from the disk at a very high speed, and the microcomputer or microprocessor can detect the data position by reviewing the table, which does not need an additional OS for exclusive-use or application programs.

Referring to FIG. 7, the reproduction apparatus for reproducing a disk recording medium according to the present invention is constructed so as to be compatible with conventional CD disks. The disk reproduction apparatus according to the present invention largely comprises CD reproduction means 200, decoding means 600, a control processor 300, a buffer memory 400 and signal conversion means 500. CD reproduction means 200 picks up the optically modulated data signal from disk 10 via pickup means 210, decodes the picked-up data by digital signal processor means 231, outputs the decoded CD data signal, and thus produces the program selection signal from a microcomputer 233 according to the key input through key input means 240. The CD reproduction means is constituted the same as conventional CD reproduction players. Servo means 232 performs tracking-servo with respect to a spindle motor 220 and pickup means 210. Decoding means 600 receives the CD reproduction signal, and performs descrambling and a predetermined error detection operation as well as error correction with respect to the obtained signal, so as to output the data. Decoding means 600 is for decoding the data signal having the data recording format according to the present invention from the CD reproduction signal. Control processor 300 recovers the data and program index table signals from the input data, transfers the initial address information of the data and program tracks to microcomputer 233 by responding with the program selection signal sent from microcomputer 233, and outputs the data signal of the selected program track. Memory means 400 stores the data index table signal, the program index table signal, and the data index sequence signal of the selected program, into a first, second and third memory areas, respectively. Signal conversion means 500 converts the data signal which is read out according to the data index sequence signal into the predetermined reproduction output signal for sending the data signal to the output device, and outputs the convened data signal. Signal converting means 500 can comprise one or more reproducing means including video reproducing means, audio reproducing means, and font reproducing means, according to the type of data.

As described above, when the reproducing apparatus of the present invention reproduces a CDK disk, CD reproduction means 200 firstly reads out the TOC from the LIA of disk 10 to get the predetermined address information, and thus sequentially reads the data index table track and program index table track according to the obtained address information so as to provide decoding means 600 with the CD reproduction signal. Decoding means 600 receives and de-scrambles the CD reproduction signal, performs error detection and error-corrections, and finally outputs the decoded data to control processor 300. Control processor 300 obtains the data index table signal and the program index table signal, and allocates these to the first and second areas of memory means 400. When a user selects a predetermined program via key input means 240, microcomputer 233 displays this program on display means 250 and supplies the program selection signal to control processor 300. Control processor 300 receives the program selection signal, and obtains the initial address information of the corresponding program by referring to the program index table residing on the second area of memory means 400. The obtained address information is supplied to microcomputer 233 which thereby seeks the corresponding program track according to the supplied address information, so as to read out the program. The read-out program signal is transferred to control processor 300 via digital signal processor 23 1 and decoding means 600, and control processor 300 stores this signal in the third area of memory means 400 in terms of the data index sequence signal of the program. Thereafter, control processor 300 refers to the data index table of the first memory area according to the data index sequence signal stored in the third memory area, so as to get the initial address of the data signal in a sequence to be transtarred to microcomputer 233. Microcomputer 233 controls pickup means 210 and servo means 232, and thus picks up the corresponding data signal from the data signal track and transfers the obtained data signal to control processor 300 via digital signal processor means 231 and decoding means 600. Control processor 300 processes the transferred data signal so as to be supplied to signal conversion means 500, and signal conversion means 500 converts the input signal into the reproduction output signal to be output.

As described above, the reproducing apparatus of the present invention can detect previously the position of data signal in the disk by the microcomputer and the control processor, and thus can pick up the next signal and temporarily hold the picked-up signal while outputting the current signal, which permits high-speed operation at an output access time. Additionally, the reproducing system does not need an additional operating system, which can lower the production cost and enable the reproduction of conventional CDDA disks.

As described above, the apparatus according to the present invention can store more information on one disk, which can maximize the recording efficiency of the disk. Also, the microcomputer (or microprocessor) does not need an additional operating system environment and for detecting the data address of the disk directly. It enables a high-speed accessing and reduces production costs, which provides an economical product.

According to the present invention, the data signal is classified into three subgroups: a still image group, a sound source group and a font group. The program can be composed of the data signal's sequence combination read from these three groups, so that variable programs can satisfy any application field. That is, the present invention is applicable to the recreational field (such as game programs, karaoke programs and music programs), the educational field (interactive education programs and animated video programs)

and the electronic publication field (electronic dictionaries, books, magazines and advertising catalogues, tour guide programs and portable electronic-mapping programs). In other words, the drawbacks of conventional CD-ROMs and CDIs are compensated for, which can thus be supplied at a lower cost while enabling the storage of a wider variety of information in a single disk.

Hereinafter, the present invention will be explained with reference to a preferred embodiment of the video music accompaniment system, which is applicable to a karaoke system.

The disk recording medium for exclusive use for video music accompaniment according to the present invention comprises mainly a lead-in area (LIA), a program area (PMA) and a lead-out area (LOA), as in the conventional CDDA system.

As described above, the LIA has Q-channel data as shown in FIG. 1.

Relating to FIG. 8, the present invention, for searching thousands of music accompaniment programs and screen structures, sets the respective table tracks on the PMA, and records the address information of the tracks onto the TOC. When the pointer value of the TOC is "01," PMIN indicates the start address of the image table track. When the TOC pointer value is "02," PMIN indicates the start address of the music table track, when "03," PMIN indicates the start address of the image data track, and when "04," PMIN indicates the start address of the music data track. When the TOC pointer value is "05," PMIN indicates the start address of the warning message track, when "A0," PMIN indicates the start address of the first track which is played first in the program area, when "A1," PMIN indicates the start address of the last track which is played last in the program area, and when "A2," PMIN indicates the start address of LOA. When the TOC pointer value is "A0" or "A1," PSEC and PFRAME show a method of coding video data. For the aforementioned TOC of the present invention, unless the pointer value is A0, A1 or A2, the content sequence can be changed according to the track allocation of the PMA. It is preferable to allocate the table tracks near the LIA, for improved searching speed and servo operation of the reproducing apparatus.

Figure 9:
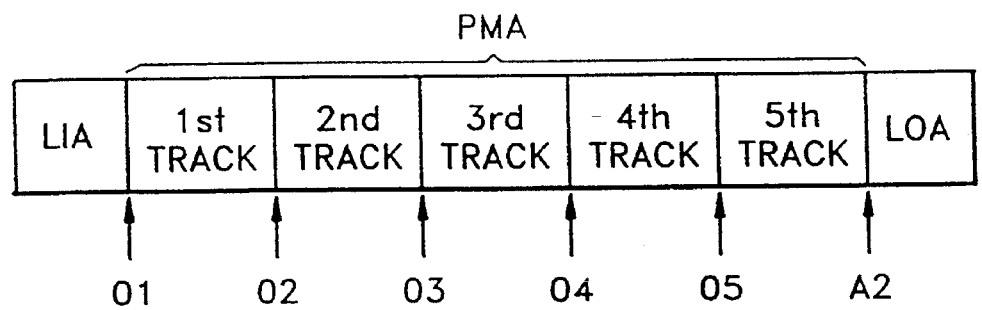
FIG. 9 illustrates an alternative embodiment of the track structure of a program area in a compact disk according to the present invention.

Relating to FIG. 9, the PMA of the CDK disk according to the present invention is largely composed of five tracks.

Figure 10:
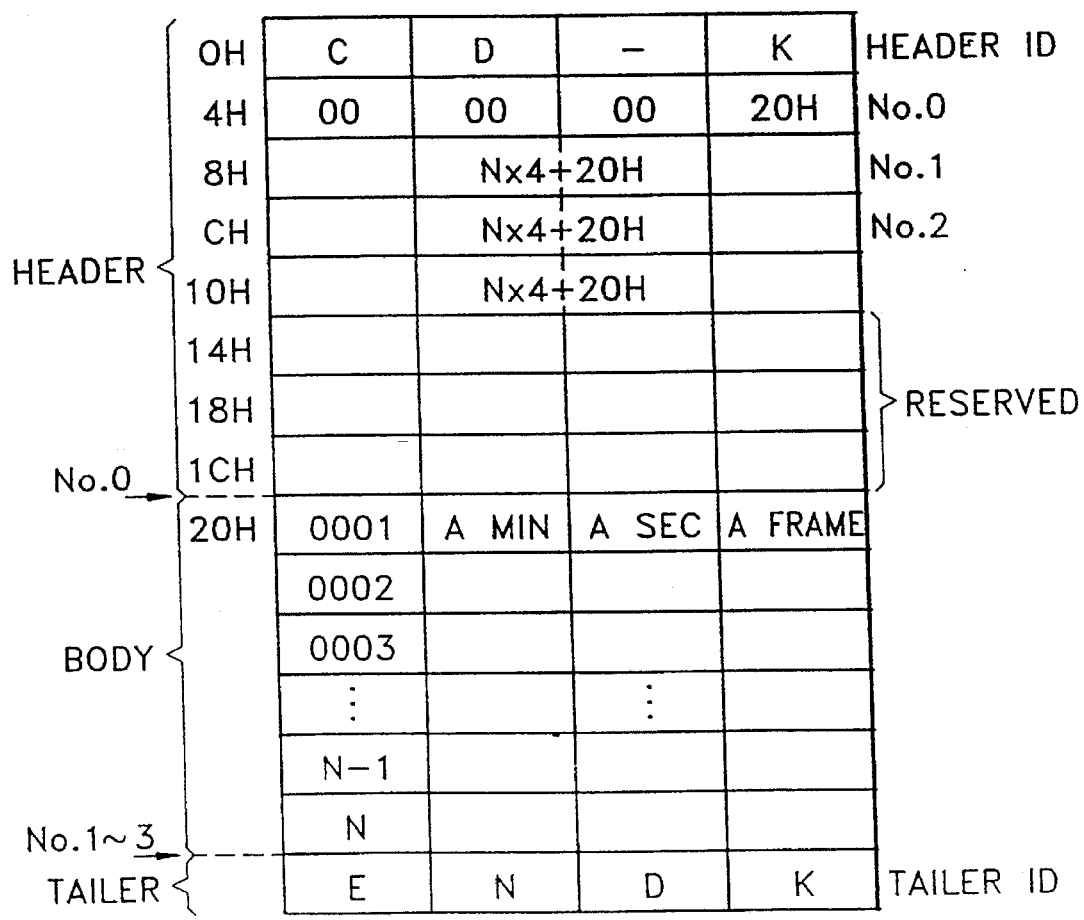
FIG. 10 shows an example of the image or music table of FIG. 9.

The first track contains the table of FIG. 10 composed of an image table, screen number, and address information. Here, N is the number of screens, for example, 5,000 pages.

The second track contains a music table, i.e., the table of FIG. 10 composed of the number of accompaniment music programs and the address information. Here, N is the number of songs, for example, 2,000 songs.

That is, the image and music table tracks have a four-byte header identifier ("CDK"), first to fourth four-byte pointers No. 0 to No. 3, and a header having a reserved twelve bytes. In addition, a body has N sets of four-byte table information, respectively indicating the initial address of the sequence and the PMIN, PSEC and PFRAME data. Below the body, a four-byte tailer identifier "END-K" follows, which signifies the end of the table. Here, the first, second and third pointers Nos. 1, 2 and 3 indicate the same value, and point to the starting address of the tailer identifier (ID).

Figure 11:
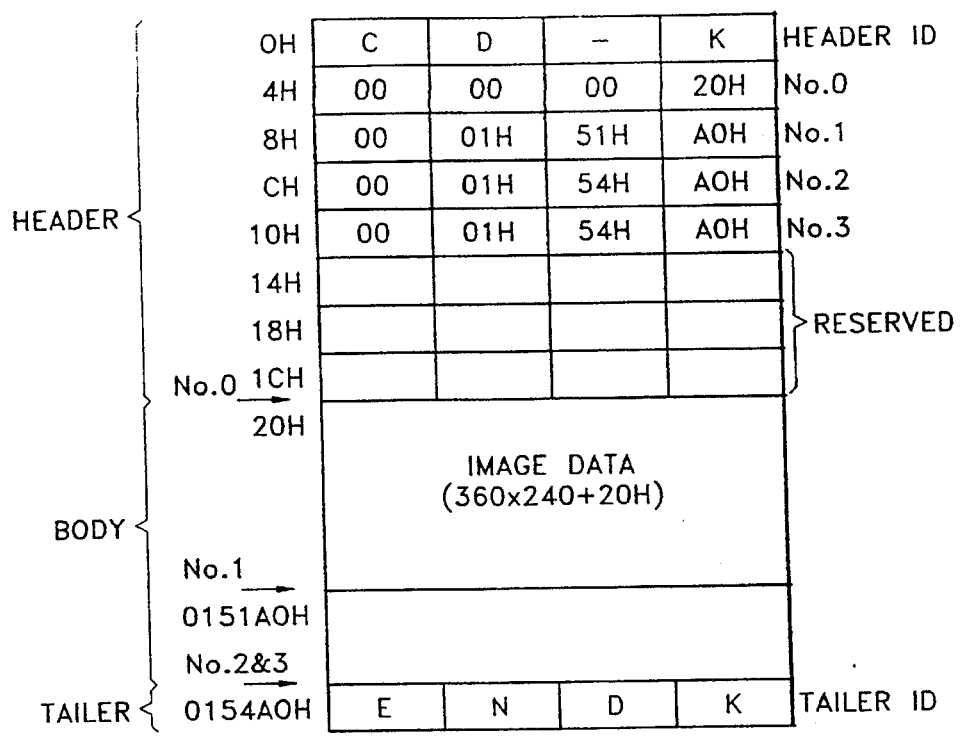
FIG. 11 shows the image data of FIG. 9.

On the third track, the image data, that is, the respective picture data are recorded in the same format as that shown in FIG. 11. For a 360×240 byte image size and the eight-bit color look-up table coding method, the image data per one screen is 360×240 bytes, and the color look-up table therefor is 256×3 bytes. Therefore, the quantity of information can be expressed in terms of the number of sections as $$\frac{360(240) + 256(3) + 4(9)}{2048} = 42.6$$

and thus results in 43 sections. In other words, the image data per picture is located continuously throughout 43 sectors.

On the fourth track, music data, for example, sound source data such as MIDI, the lyrics data and image sequence data, is recorded as shown in FIG. 14 and FIG. 15.

A CD disk can contain about 800 Mb of information given the maximum reproduction time of 75 minutes. In an embodiment of the present invention, 2,000 or more music accompaniment programs and 5,000 or more still images (one page each) are recorded on one CD disk. The quantity of information of a one-page still image is 92.16 Kb (384×240) in case of the DYUV coding method. Accordingly, the quantity of information occupied by a 5,000-page still image becomes 460.8 Mb (5,000×92.16 Kb). The music accompaniment program uses up 50 Kb per song, and thus requires 100 Mb of memory (2,000×50 Kb). The video data table occupies 20 Kb (5,000×4 bytes) and the music table occupies 8 Kb (2,000×4 bytes). Thus, the overall information quantity of the first through fourth tracks is 8 Kb+20 Kb+100 Mb+460.8 Mb, for a total of 560.828 Mb.

Figure 12:
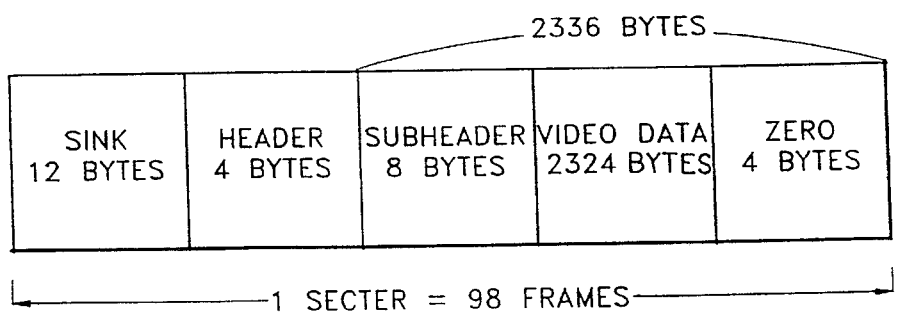
FIG. 12 illustrates a sector structure corresponding to MODE 2 FORM 2.

The fifth track contains a warning message which is digitally sampled for the conventional CD-type. (Here, for example, a voice message or CDG-type character message may inform the user thus: "This disk is a Samsung CDK disk which needs a Samsung CDK player for reproduction.") In an embodiment of the present invention, the video data uses MODE2 FORM2 sector structure of the CDI disk format shown in FIG. 12. Accordingly, since one screen of information is 92.16 Kb/2336 bytes (39.4), about 40 sectors per screen are needed. There/ore, 75 sectors (or blocks) are read out, so that one screen can be read out in 0.53 seconds. Music accompaniment programs are composed of music instrument digital interface (MIDI) data. The MIDI signal has the format shown in the following Table 1.

TABLE 1

|  |  | Condition Byte | Data Byte |
|---|---|---|---|
| channel message | Note OFF | 8X | 2 |
|  | Note ON | 9X | 2 |
|  | Poly Phonic Key Pressure | AX | 2 |
|  | Control Change | BX | 2 |
|  | Program Pressure | CX | 1 |
|  | Channel Pressure | DX | 1 |
|  | Pitch Foil Change | EX | 2 |
| system message | Exclusive Change | F0 | Not fixed |
|  | Cutter Frame Change | F1 | 1 |
|  | Song Position Pointer | F2 | 2 |
|  | Song Selector | F3 | 1 |
|  | Tune Request | F6 | Nothing |
|  | End of Exclusive | F7 | Nothing |
|  | Timing Clock | F8 | Nothing |
|  | Start | FA | Nothing |
|  | Continue | FB | Nothing |
|  | Stop | FC | Nothing |
|  | Active Sensing | FE | Nothing |
|  | System Request | FF | Nothing |

MIDI signal is composed of one "state" byte and at least one data byte. The MIDI signal is largely grouped into channel message and system message portions, according to the state byte. Meanwhile, the channel message is grouped into voice message and mode message sections and the system message is grouped into an exclusive message section, a common message section and a real-time message section. The note on/off message of FIG. 13 indicates the reproduced audio tone which is divided into 128 tone levels, and the reproduced magnitude which is divided into 128 levels of magnitude.

The music accompaniment data and lyrics data of the present invention can use the conventional computer karaoke-type MIDI format, and the image sequence data constituting the background picture for each song is stored for the respective music programs by using the system exclusive message. Accordingly, the music accompaniment program can be composed as in FIGS. 14 and 15.

Figure 16:
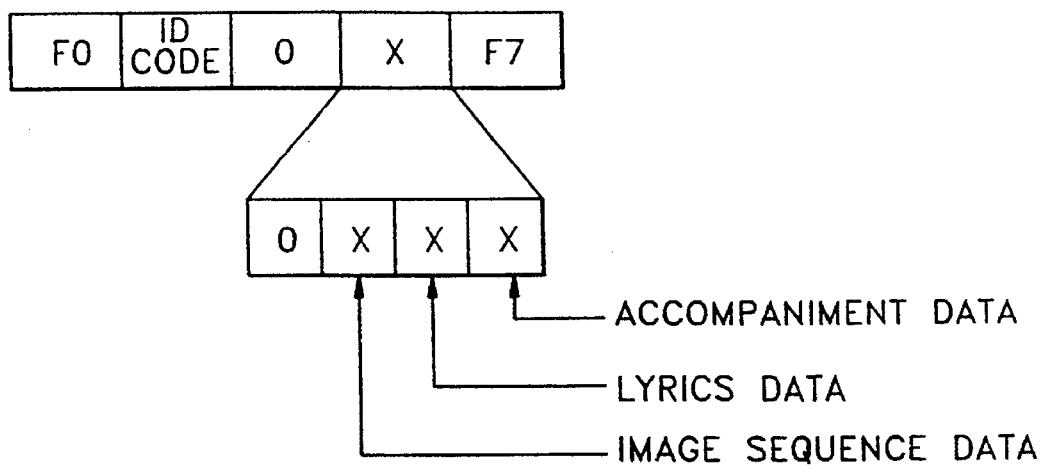
FIG. 16 shows an exclusive message for timing synchronization of accompaniment data, character data and video data.

Firstly, referring to FIG. 14, a song program header contains the information about the header ID code, pointer 0, pointer 1, pointer 2, pointer 3 and the reserved bytes. The body is largely composed of a sound source, i.e., music accompaniment data, lyrics data and image sequence data, which is composed according to the MIDI format. Accordingly, pointer 0 of the header indicates the initial address of the body, pointer 1 indicates the initial address of the lyrics data, pointer 2 indicates the initial address of the image sequence data, and pointer 3 indicates the initial address of the tailer ID. The synchronization of music accompaniment data, lyrics data and image sequence data can be accomplished using a MIDI time code which includes a header frame message, a full time code message, a user-bit message and a set-up message. Moreover, font and screen synchronizations can be matched by inserting control data into the music accompaniment data. For example, an exclusive message can be used as shown in FIG. 16, so that a manufacturer ID code and flag code can be loaded thereon.

Flag code 0X (hexadecimal) is a kind of data-byte, and among the four lower bits of the flag code, the least significant bit is used for the effective flag of music accompaniment data, the second bit is used for the output flag of the lyrics data, and the third bit is used for the output flag of image sequence data.

Next, referring to FIG. 15, the song program header comprises the information about the body initial address pointer and the tailer pointer. The body has flag information of FIG. 16 for respective music accompaniment data, and is followed by the corresponding lyrics data and the image sequence, i.e., the number of screens.

Figure 17:
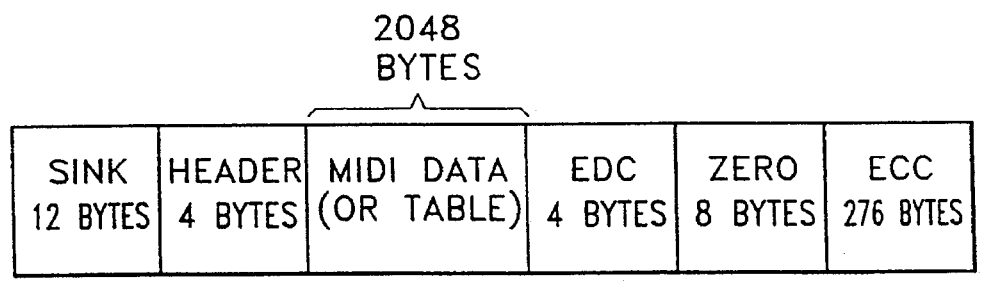
FIGS. 17 and 18 illustrate sector structures corresponding to FORM 1 of MODE 1 and MODE 2.
Figure 18:
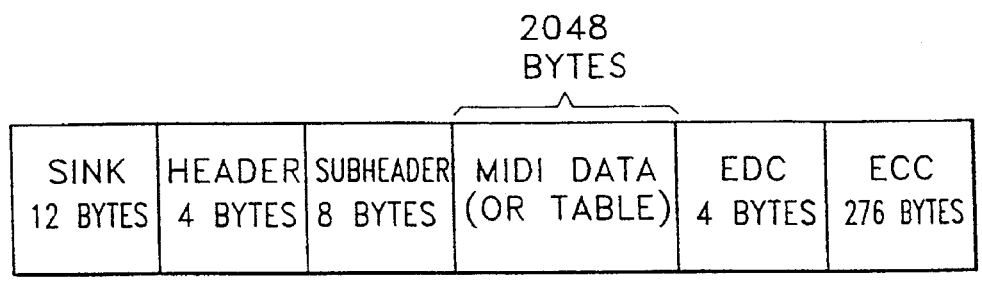

The image sequence data shows the sequence of the screens which are previously edited for being supplied at each predetermined time. The screens are compiled from 5,000 or more pages of video data into a predetermined number of screens. For example, if a three-minute music accompaniment program provides for different screens every two seconds, ninety pages of screens are necessary. Thus, to play 2,000 three-minute songs, 180,000 (90×2,000) screens (or pages) are necessary, but because a certain picture can be used for other musical data conforming to the meaning of the lyrical data, proper combinations of about 5,000 pages of picture screens (as a basic number) can produce about ninety screens. Also, the screens can be changed in time with each musical bar. The MIDI data of the music accompaniment program track has the sector structure of MODE1 of FIG. 17 or MODE2 FORM1 of FIG. 18, which shows a higher error correction capability than the MODE2 FORM2 sector of the video data. Accordingly, if each music accompaniment program is 50 Kb, it is spread through about 25 sectors, and if the video data program is 92 Kb, it is spread through about 40 sectors.

As aforementioned, the disk recording medium for the exclusive use of video music accompaniment according to the present invention does not access the program directly by referring to TOC of the conventional CD disk, but, first, accesses the table and then refers to the next table, so as to access each program, which enables the accessing of thousands of programs. Moreover, the audio signal is recorded on the PMA, not via the sampling method which requires an abundance of information, but by forming the audio signal into MIDI data, so that more song programs can be recorded on one disk. Therefore, although sound quality is somewhat degraded, the music accompaniment, lyrics and background screens can be supplied simultaneously.

The recording format of the aforementioned embodiment is for explaining the present invention, and various modifications can be made to the present invention. For example, the video data can be encoded by not only the DYUV coding method, but also via RGBnnn coding (where n is the number of bits per color signal), a color look-up table method, a run-length coding method or a data compression coding method. When the data compression coding method is used, more video data can be stored and animated screen displays or moving pictures can be accomplished.

Figure 19:
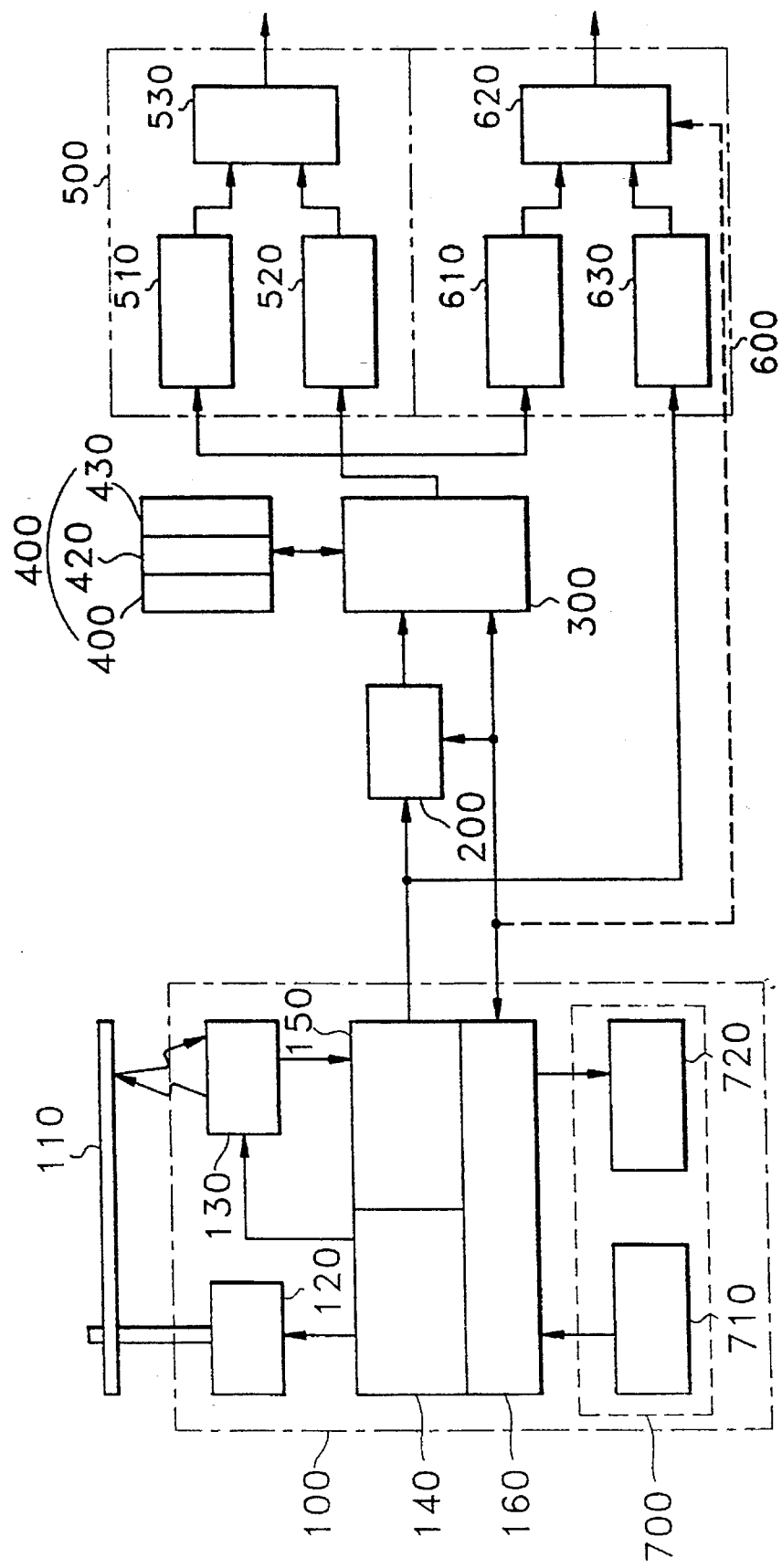
FIG. 19 is a high level block diagram of a video song accompaniment apparatus according to the present invention.

Referring to FIG. 19, the video music-accompaniment apparatus according to the present invention comprises CD reproduction means 100, decoding means 200, a control processor 300, memory means 400, video processing means 500, audio processing means 600 and input and display means 700. CD reproduction means 100 picks up the optically modulated data signal from disk 110 via pickup means 130, decodes the picked-up signal via digital signal processor means 150, and outputs the decoded CD data signal. Servo means 140 performs a tracking-servo operation with respect to a spindle motor 120 and pickup means 130. A microcomputer 160 controls each section of CD reproducing means 100 according to the key input signal, so as to produce a display signal, and thereby operates as a sub-processor of control processor 300.

Decoding means 200 receives and de-scrambles the CD reproduction signal, and performs a predetermined error detection as well as error corrections with respect to the obtained signal, and thus outputs a CDK signal. Control processor 300 receives the CDK signal, and stores it in memory means 400, and thereby operates as a main processor of microcomputer 160 of CD reproduction means 100; and further possesses MIDI signal processing capability for processing MIDI data among CDK signals. Control processor 300 supplies the accompaniment data among the processed MIDI data to audio processing means 600 at a rate of 3.125 Kb per second in the format of a ten-bit MIDI signal per byte, and provides video processing means 500 with the video data and character data. Memory means 400 includes a first memory area 410 for storing the program table, a second memory area 420 for storing video data table, and a third memory area 430 for storing a song program data. Video processing means 500 includes a video processor 510, a character processor 520 and a mixer 530. Video processor 510 comprises at least one field (or frame) memory means, and thereby forms a television signal from the input video data, so as to output the television signal to a video display device, i.e., a CRT or monitor. Character processor 520 outputs the character video signal according to the input font data. Mixer 530 mixes the television signal output from video processor 510 with the character video signal, so as to output the mixed television signal to a television receiver (not shown). Audio processing means 600 comprises a sound source processor 610, a selector 620 and a digital-to-analog converter 630. For example, the audio source processor 610 (i.e., a digital sound generator such as Yamaha's model YM-2163, YM-3812 or YMF-262) reproduces and outputs the accompaniment signal according to the applied MIDI signal. Selector 620 selectively outputs the CD reproducing signal during CD disk reproduction through digital-to-analog converter 630 and the accompaniment signal from the aforementioned sound source processor 610, to a television's audio circuitry or the like, while responding to the disk determining operation of CD reproducing means 100. Input and display means 700 comprises input means 710 for producing a key signal according to the key input (e.g., from a remote controller), and display means 720 for displaying the operation condition of the system.

The operation of the music video accompaniment apparatus (FIG. 19) according to the present invention will be explained with reference to FIGS. 20 and 21.

Figure 20:
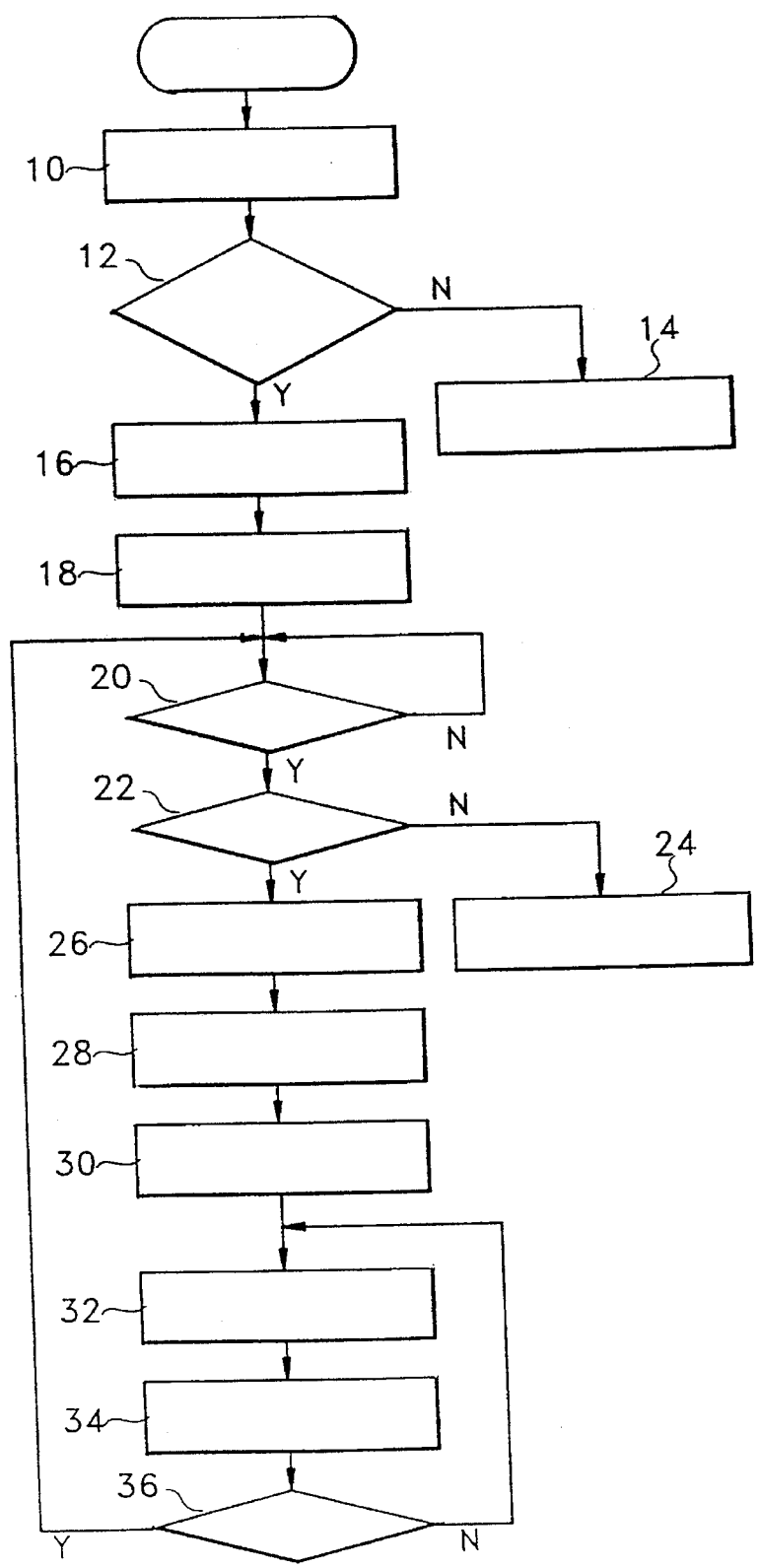
FIGS. 20 and 21 are flowcharts for explaining operations of a video song accompaniment apparatus according to the present invention.

Once the device loads a disk, CD reproduction apparatus 100 reads out the TOC from the LIA of disk 110 as shown in FIG. 20 (step 10). By referring to the TOC format, microcomputer 160 determines the type of disk loaded, and determines whether disk 110 is a CDK disk (step 12) and if not, the device performs processing of corresponding CD disks such as a CDDA disk, etc., (step 14). Here, if the system is additionally equipped with a CDG decoder, CDI decoder etc., the corresponding CDG disks or CDI disks can be processed. For example, in case of CDDA disks, control processor 300 produces an audio output selection signal (shown as a dashed signal path in FIG. 19), so that selector 620 outputs the CDDA audio signal. If the disk is a CDK disk at step 12, microcomputer 160 searches the PMA program table track and video data table track by referring to the TOC, reads the table signal via pickup means 130 and digital signal processor 150, and outputs the read table signal (steps 16 and 18). The input of a key signal via input means 710 is determined (step 20), and if a key input signal is present, it is decoded. Thereafter, unless a song is selected (step 22), the corresponding key processing is executed (step 24), otherwise a song program selection signal is produced (step 26). If the address of the corresponding song program is input from control processor 300 while responding to the music selection signal generation (step 28), microcomputer 160 controls servo means 140, and moves pickup means 130 onto the program track, so as to search the corresponding song program. Then, the corresponding song program is read to be output (step 30). When a video data address signal is input from control processor 300 (step 32), microcomputer 160 searches the video data track of the disk and reads the corresponding video data, to thereby output the data (step 34). Steps 32 and 34 are repeated until the completion of a corresponding music reproduction operation (step 36), whereupon the flow is fed back to step 20.

Figure 21:
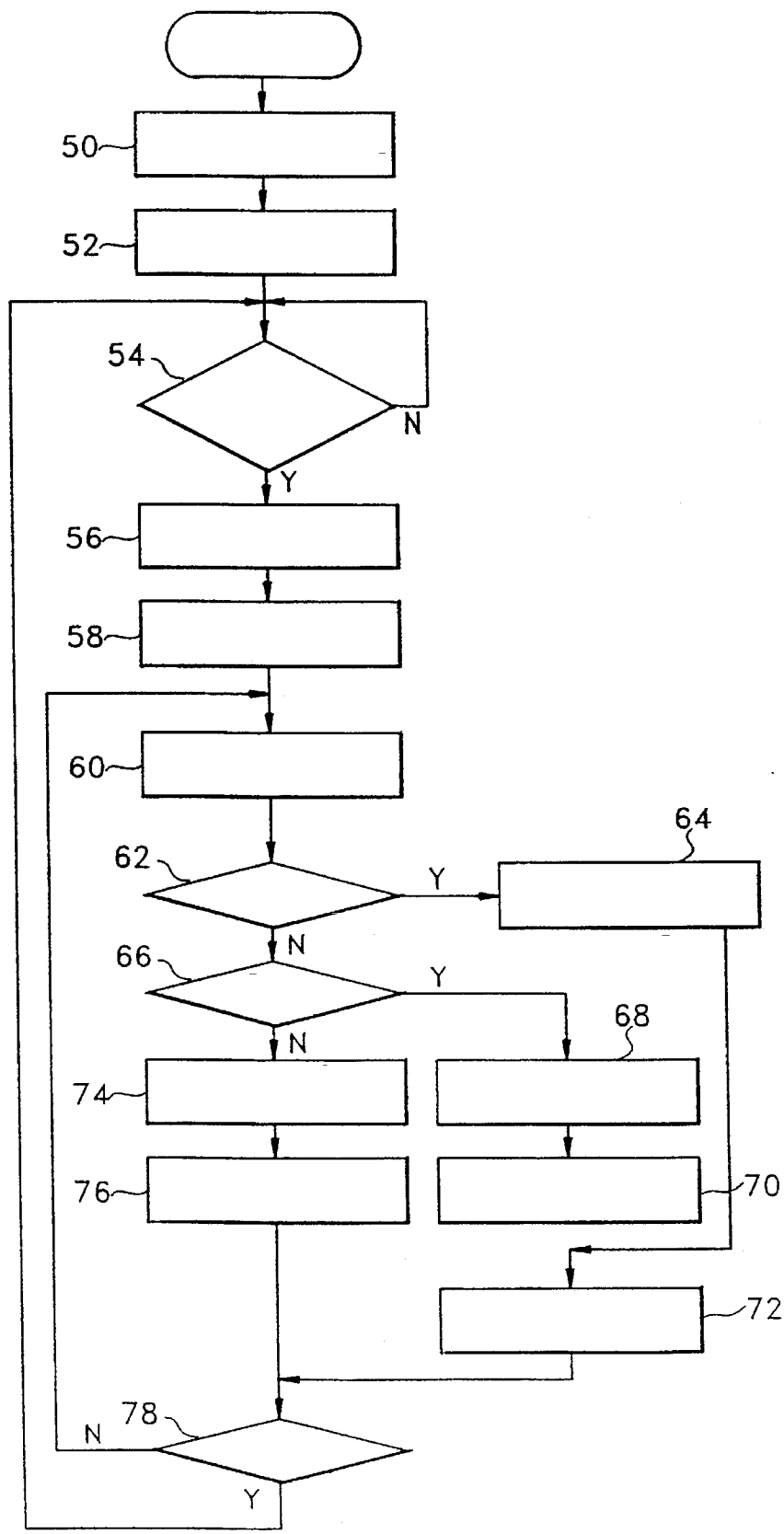

Referring to FIG. 21, for a CDK disk, the CD signal supplied from CD reproduction means 100 is de-scrambled via decoding means 200, error-corrected, and input to control processor 300. Control processor 300 receives the CDK signal, so as to store a music table in first memory area 410 of memory means 400 (step 50) and an image table in second memory area 420 (step 52). When a program selection signal is provided from microcomputer 160 (step 54), control processor 300 produces the address signal of the corresponding song program by referring to the music table stored in the first memory area (step 56). When the song data is input through decoding means 200 by responding to the address signal, the data is stored in third memory area 430 of memory means 400 (step 58). Control processor 300 reads out the song data from third memory area 430, deciphers the data using the MIDI data format, and controls CD reproduction means 100 and video and audio processing means 500 and 600 according to the deciphered results (step 60). In the case of a font data output (step 62), the decoded font data is supplied to the character processor 520. Character processor 520 produces a character video signal according to the input font data (step 64). For outputting the image sequence data (step 66), the number of corresponding image data is read in reference with the image sequence data in the third memory area, and outputs a video data address signal by checking the address of the image data number which is read previously by referring to the image table of second memory area 420 (step 68). Control processor 300 receives the video data signal provided from CD reproducing means 100 via decoding means 200 by responding to the video data address signal, and supplies the received video data signal to video processor 510. Video processor 510 stores the input video data in the second field memory and converts the video data stored in the second field memory into the analog television signal, so as to output the converted signal (step 0). The television signal and character video signal produced at step 64 are mixed by mixer 530, and the video signal is output to a television receiver (step 72). At steps 62 and 66, the MIDI data (but not the font data and the video data outputs) is converted to a ten-bit MIDI signal, so as to be supplied to sound source processor 610 (step 74), and sound source processor 610 receives the MIDI signal and outputs the combined analog audio signal to the audio apparatus (step 76). Steps 60 through 76 are repeated until music reproduction is finished at step 78. Upon completion of the music reproduction, the flow is fed back to step 54.

As described above, according to the present invention, accompaniment for 2,000 and more songs can be accomplished using one CDK disk. The background screens can be constructed using 5,000 or more pages of video screen data in an edited sequence, conforming to the lyrical content of the respective songs, thereby enabling a compact and light-weight apparatus to be provided whose cost is significantly reduced. The apparatus according to the present invention is very economical because it maintains compatibility with conventional compact disks. Also, it is unnecessary to change the disks as in the conventional CDG or laser disk player, so that high-speed searching operations are possible as in the case of the computer karaoke apparatus. Thus, the apparatus of the present invention enables high quality background screen images to be displayed in accordance with the lyrics, which are not provided by the conventional computer karaoke apparatus or CDG karaoke apparatus.

The aforementioned embodiment of the present invention explains one example of the compact disk, but recordable and reproducible disks (such as CD-ROMs and MOD disks) can also be used for the present invention. In this case, the user is enabled to not only directly insert new music programs, but also to determine the editing sequence of the background screen, while referring to the table indices of the video data, thus facilitating more enjoyable video music accompaniment.

What is claimed is:

1. A disk recording medium having a lead-in area, a program area and a lead-out area, wherein said program area comprises:

a first track on which a plurality of data signals each of which has a different index from other data signals is loaded;

a second track on which a plurality of programs is loaded, said plurality of programs consisting of the sequential combination of indices of at least one data signal among the plurality of data signals from said first track, each program on said second track having a different index from the others;

a third track on which a data index table comprising the indices of the respective data signals from said first track and initial address information is loaded; and a fourth track on which a program index table comprising the indices of the respective programs from said second track and initial address information is loaded, wherein said lead-in area is loaded with a table of contents comprising the initial address information and a plurality of pointers, each of which is different from the others and designates the respective tracks of the program area and the initial position of the lead-out area.

2. The disk recording medium according to claim 1, wherein each said data signal is a still image data signal.

3. The disk recording medium according to claim 1, wherein each said data signal is an audio data signal.

4. The disk recording medium according to claim 1, wherein each said data signal is a font data signal.

5. The disk recording medium according to claim 1, wherein said first track includes at least two data signal types selected from the group consisting of a still image data signal, an audio data signal and a font data signal.

6. The disk recording medium according to claim 5, wherein said third track includes at least two data index tables corresponding to said at least two data signal types.

7. The disk recording medium according to claim 6, wherein each said program consists of a sequential combination of the index tables of said at least two data signal types.

8. The disk recording medium according to claim 1, wherein said program area further comprises a fifth track on which a warning message is loaded.

9. The disk recording medium according to claim 8, wherein said warning message adopts a compact disk digital audio (CDDA) recording format.

10. The disk recording medium according to claim 1, wherein said table of contents further comprises data indicative of a coding method for said data signal.

11. The disk recording medium according to claim 2, wherein said still picture data signal is recorded by a combination of at least one among MODE 1 & MODE 2 FORM1 and MODE 2 FORM 2 according to a compact disk interactive (CDI) system.

12. The disk recording medium according to claim 2, wherein said still picture data signal is coded by a delta YUV (DYUV) coding method.

13. The disk recording medium according to claim 2, wherein said still picture data signal is coded by an RGBnnn coding method where n is an integer signifying coding bits per color signal component.

14. The disk recording medium according to claim 1, wherein said data signal is a graphics data signal coded by a color look-up table coding method.

15. The disk recording medium according to claim 1, wherein said data signal is an animated video data signal coded by a run-length coding method.

16. The disk recording medium according to claim 3, wherein said audio data signal is a musical instrument digital interface (MIDI)data signal.

17. A reproduction method for a disk recording medium having a lead-in area, a program area and a lead-out area, comprising the steps of:

reading a table of contents from the lead-in area of the disk to obtain first and second address information during initial reproduction;

reading a data index table and a program index table from a first track and a second track of the program area according to the first and second initial address information, to store the read data and program index tables in a first memory area and a second memory area, respectively;

reading a dam index sequence signal of a corresponding program from a third track of the program area according to the index and initial address information of a selected program, to store the read data index sequence signal in a third memory area;

sequentially obtaining the initial address information of the data index from the dam index table stored in the first memory area according to the data index sequence signal stored in the third memory area; and reading a corresponding data signal from a fourth track of the program area according to the initial address information of the respective data signals, to process, reproduce and output the read data signal.

18. A disk recording medium for exclusive-use with music video accompaniment comprising a lead-in area, a program area and a lead-out area, wherein said program area comprises:

a first track for storing an image table on which index information of a plurality of video data constituting respective background pictures of respective song accompaniment programs is loaded;

a second track for storing a music image table on which song index information of each song accompaniment program is loaded;

a third track for storing video data on which the plurality of video data having video index information each of which is different from all others, is loaded; and a fourth track for storing music data on which the song accompaniment programs each having MIDI data, lyrics data and sequence data of the video data corresponding to respective songs for accompaniment, and having respective song index information, is loaded, wherein the lead-in area includes a table of contents comprising initial address information and a plurality of pointers, each of which is different from all others, and which designates respective tracks in the program area and the initial position of the lead-out area.

19. The disk recording medium according to claim 18, wherein the units representing said plurality of video data are pages.

20. The disk recording medium according to claim 19, wherein said background pictures of said song accompaniment programs are constituted by video index sequence data according to a combination of said video data.

21. The disk recording medium according to claim 20, wherein said combination of said video data corresponds to mood of the corresponding song and lyrics.

22. The disk recording medium according to claim 19, wherein each of said background pictures is changed in accordance with a synchronizing unit of a respective one of said song accompaniment programs.

23. The disk recording medium according to claim 19, wherein each of said background pictures is changed in time with one musical bar of a respective one of song accompaniment programs.

24. The disk recording medium according to claim 18, wherein each of said plurality of video data is recorded by a MODE2 FORM2 method of a CDI system.

25. The disk recording medium according to claim 18, wherein each said song accompaniment program is recorded by MODE1 FORM1 or MODE2 FORM1 of a CDI system.

26. The disk recording medium according to claim 18, wherein each of said plurality of video data is recorded by one coding method selected from the group consisting of a DYUV coding method, an RGBnnn (where n is the number of coding bits per color signal) coding method, a color look-up table coding method or a run-length coding method.

27. The disk recording medium according to claim 18, wherein said lyrics data and video data of each said song accompaniment program is previously constituted as a data format.

28. The disk recording medium according to claim 18, wherein said song accompaniment MIDI data includes a timing code for synchronizing the lyrics and video outputs.

29. The disk recording medium according to claim 18, wherein said program area further comprises a fifth track on which a message recorded by a CDDA method is loaded, following said fourth track.

30. The disk recording medium according to claim 29, wherein said fifth track includes graphical data for use with a reproducible message by a compact disk graphics (CDG) method in a graphic sub-code channel.

31. A reproduction method for a disk recording medium for exclusive-use with music video accompaniment having a lead-in area, a program area and a lead-out area, comprising the steps of:

reading a table of contents from the lead-in area of the disk recording medium to obtain first and second address information during initial reproduction;

reading an image table and a music table from a first track and a second track of the program area according to the first and second initial address information, for storing the read image and music tables in a first memory area and a second memory area, respectively;

obtaining address information of the selected song accompaniment program with reference to the music table of the second memory area according to selection of a song accompaniment program, and reading corresponding song accompaniment program data from a fourth track of the disk recording medium according to the obtained address information for storing respective read data in a third memory area; and sequentially reading corresponding video data from a third track of the disk recording medium with reference to a video data sequence table among the song accompaniment program data stored in the third memory area, restoring the MIDI data read from the third memory area into an audio signal to output the restored audio signal, and simultaneously mixing the read video data with the lyrics data read from the third memory area to display the mixed data as a video signal on a display.

32. The reproduction method for a disk recording medium for exclusive-use with music video accompaniment according to claim 31, wherein said video data is previously read in correspondence with an audio output, and then is output in synchronization with said corresponding audio output.

* * * * *